United States Patent [19]
Tobias

[11] 3,918,493
[45] Nov. 11, 1975

[54] VALVE CONSTRUCTION

[76] Inventor: John D. Tobias, 233 E. Bloomfield, Royal Oak, Mich. 48073

[22] Filed: Oct. 24, 1972

[21] Appl. No.: 300,165

Related U.S. Application Data

[63] Continuation-in-part of Ser. No. 230,845, March 1, 1972, abandoned.

[52] U.S. Cl. .................... 137/625.23; 29/157.1 R
[51] Int. Cl.² ......................................... F16K 11/02
[58] Field of Search ....... 137/625.23, 625.24, 625.2, 137/86, 625.21, 625.22; 251/317; 29/157.1 R

[56] References Cited
UNITED STATES PATENTS

| | | | |
|---|---|---|---|
| 1,024,909 | 4/1912 | Powelsen ...................... | 137/625.23 |
| 1,154,746 | 9/1915 | Champ........................ | 137/625.23 X |
| 1,602,281 | 10/1926 | Merola......................... | 137/625.23 |
| 2,127,679 | 8/1938 | Dudley......................... | 137/625.23 |
| 2,328,606 | 9/1943 | Boldt .......................... | 137/625.23 X |
| 2,374,714 | 5/1945 | Turchan et al. ................ | 137/625.23 |
| 2,547,929 | 4/1951 | Dawson ........................ | 137/625.23 |
| 2,606,736 | 8/1952 | Ferm........................... | 137/625.68 X |
| 2,822,821 | 2/1958 | Gordon......................... | 137/625.23 |
| 2,991,804 | 7/1961 | Merkle......................... | 137/625.23 |
| 3,186,436 | 6/1965 | Modrin ........................ | 137/625.24 X |
| 3,217,744 | 11/1965 | Racicot........................ | 137/625.24 X |
| 3,364,328 | 1/1968 | Manz .......................... | 137/625.23 X |
| 3,643,698 | 2/1972 | Smith.......................... | 137/625.23 |
| 3,650,295 | 3/1972 | Smith.......................... | 137/625.24 X |

*Primary Examiner*—Martin P. Schwadron
*Assistant Examiner*—Robert J. Miller
*Attorney, Agent, or Firm*—Gifford, Chandler & Sheridan

[57] ABSTRACT

A spool valve is characterized by the fact that perforations required in the core and sleeve members can be made simultaneously by a single machining operation while the core and sleeve are in a first or "manufacturing" position. The valve becomes functional by rotating, and in some cases longitudinally adjusting, the core relative to the sleeve to various operational positions for fluid passage through the valve. The valve is of special value in the supplying of fluid to and the removing of fluid from a hydraulic lift when one, or two, of such perforations extending through core and sleeve is in the form of a transverse peripheral channel.

17 Claims, 24 Drawing Figures

VALVE CONSTRUCTION

RELATIONSHIP TO OTHER PATENT APPLICATIONS

This application is a continuation-in-part of U.S. patent application Ser. No. 230,845 filed Mar. 1, 1972 and entitled "Valve Construction" now abandoned.

BACKGROUND OF THE INVENTION

Spool valves of the type dealt with herein consist essentially of a generally cylindrical sleeve member, a generally cylindrical core member rotatably mounted in said sleeve, perforations in the sleeve which serve as fluid inlet and fluid outlet ports, and perforations in the core which register for fluid flow with selected sleeve perforations upon rotation of the core relative to the sleeve.

The prior art technique for manufacturing such valves had involved the perforating of the core and sleeve in separate machine operations until, as pointed out in the above identified patent applications, it was discovered that at least some of the perforations could be made simultaneously in sleeve and core by a single machine operation. It is pointed out in said patent application that in one position of sleeve and core (the manufacturing position) a cylindrical hole, for example, can be drilled completely through both sleeve and core on a transverse axis parallel to and offset to one side of a plane containing the longitudinal axis of the valve. It may be noted, that, following such a drilling operation and following the rotation of the core 180° relative to the sleeve, the perforation in the sleeve and core will be disposed on respective parallel axis offset from opposite sides of the plane. The latter position can then serve, for example, as an "off" position, while rotation of the core clockwise and counterclockwise causes a core perforation to register, respectively, with different sleeve perforations to provide a variety of fluid pathways through the valve.

SUMMARY OF THE INVENTION

My invention lies in a highly simplified spool valve of the type disclosed in my above mentioned patent application and also lies in a structure in which such valve is especially valuable. The latter structure is one, such as a hydraulic lift, to which it is desired to supply fluid to a first side of a piston while withdrawing fluid from the second side and, alternately, reversing fluid flow to withdraw fluid from the first side and supply it to the second side.

The spool valve of the invention is one wherein, in one position of the sleeve relative to the core (the manufacturing position), at least one transverse perforation extending through the sleeve and core is in the form of a peripheral channel. The spool valve may be provided, for example, with two such peripheral channels.

It will be seen that for some applications a peripheral channel perforation has an advantage over a cylindrical hole perforation in being more versatile in registering a relatively wide area of perforation in a core, for example, with a juxtaposed perforation in a sleeve. In other words, an effective quantity of fluid can be passed from a core perforation to a sleeve perforation over a wider range of relative positions of a core to sleeve when the respective perforations are formed as a transverse peripheral channel. This advantage is particularly welcome in devices requiring auxiliary structures with spatial requirements which limit the choice of operational positions of core relative to sleeve. The relatively larger peripheral channels, as compared to the cylindrical holes used, also permits better control of the inflow of surging fluids into the valve.

An advantage achieved in the present invention is that very accurate control of fluid flow is possible with a highly simplified structure.

DESCRIPTION OF THE DRAWINGS

FIG. 13 is an exploded perspective view of a fourth embodiment of a spool valve embodying the invention wherein two manufacturing positions of the valve are spaced radially from each other;

FIGS. 14–A, 14–B, 14–C and 14–D are cross-sectional views of the valve of FIG. 13 taken substantially along the line E–F and showing, respectively, a first manufacturing position, a second manufacturing position, a third and operation position, and a fourth and operational position of the core relative to the sleeve;

FIGS. 15–A, 15–B, 15–C and 15–D are cross-sectional views of the valve of FIG. 13 taken substantially along the line G–H and showing, respectively, views corresponding to FIGS. 14–A, 14–B, 14–C and 14–D;

FIG. 16 is a cross-sectional view of the valve of FIG. 13 as used to control fluid flow to and from a hydraulic lift (not shown);

DESCRIPTION OF THE PREFERRED EMBODIMENT

Figures 1, 2, 3, 4, 5, 6, 7:
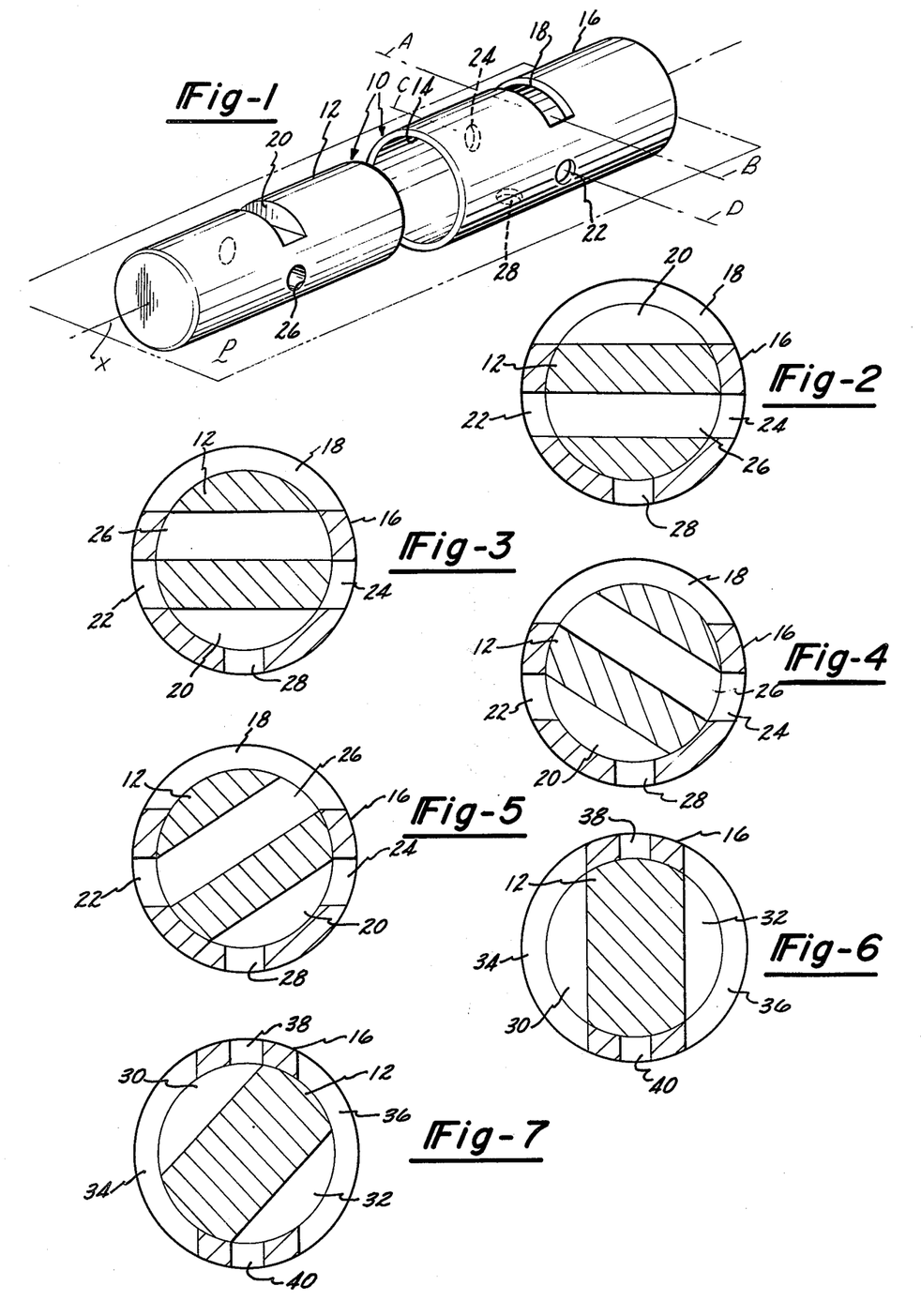
FIG. 1 is an exploded perspective view of a spool valve embodying the invention and wherein a peripheral channel and a cylindrical hole lie substantially in the same plane transverse to the axis of the valve.
FIG. 2 is a cross-sectional view of a spool valve showing the assembled valve of FIG. 1 in its manufacturing position.
FIG. 3 is a cross-sectional view of the spool valve of FIG. 2 with the core rotated 180° relative to the sleeve.
FIG. 4 is a cross-sectional view of the spool valve of FIG. 2 following rotation of the core member relative to the sleeve member to a second and operation position.
FIG. 5 is a cross-sectional view of the spool valve of FIG. 2 following rotation of the core member relative to the sleeve member to a third and operational position.
FIG. 6 is a cross-sectional view of a second spool valve modification in its manufacturing position and comprising two peripheral channels.
FIG. 7 is a cross-sectional view of the spool valve of FIG. 6 following rotation of the core member relative to the sleeve member to a second and operational position.

FIG. 1 illustrates in exploded view a spool valve, indicated generally as 10, and comprising a core member 12 which can be rotatably mounted in a longitudinal bore 14 of the sleeve member 16.

The sleeve member 16 is perforated at 18 on an axis A–B transverse to an axis X of the core and sleeve members and offset from a plane P which includes the axis X. The perforation 18, in a first position of the core 12 relative to the sleeve 16, extends into a perforation 20 in the core member 12, the perforation 18, 20 forming a peripheral channel with congruent boundaries at the respective interface of the chananel in core member 12 and sleeve member 16 (see FIG. 2).

The sleeve member 16 is also perforated at 22, 24 on an axis C–D transverse to axis X. The perforation 22, 24, in a first position of the core 12 relative to the sleeve 16, extends into a core perforation 26 forming a cylindrical hole with congruent boundaries at the respective interfaces of core member 12 and sleeve member 16 (see FIG. 2). An intermediate perforation 28 is made in the sleeve only.

Referring to FIGS. 2–5 inclusive, four positions of the core 12 relative to the sleeve 16 are shown. FIG. 2 illustrates the first, or manufacturing, position. It can be seen in FIG. 2 that a transverse peripheral channel can be made through the core 12 and sleeve 16 to form, by a single machine operation, the core perforation 20 and the sleeve perforation 18. Similarly, it can be seen that a transverse cylindrical hole can be made by a single machine operation to form core perforation 26 and sleeve perforations 22, 24.

FIG. 3 shows the valve of the invention about a 180° rotation of the core 12 relative to the sleeve 16 and shows the initially juxtaposed perforations as now being on opposite sides of a plane through the longitudinal axis of the valve. In this connection it may be observed, in FIG. 3 for example, that the lower edge of core perforation 26 is almost an extension of the top edges of sleeve perforations 22 and 24, and the top edge of core perforation 26 is almost an exact extension of the bottom edge of channel 18. This is results in the inlet fluid pressure directed toward sleeve port 22 (via hole 26) to be almost instantaneously shifted toward sleeve port 24 as core 12 is rotated clockwise from its position as shown in FIG. 5. In those cases where it is desirable to build up the pressure in core perforation 26 before the latter registers with either sleeve perforation 22 or 24 provision is made for spacing the core perforation 26 and sleeve perforation 22, 24 farther from each other. In the latter case, however, it is still most desirable that the sleeve inlet and core inlet ports be peripheral channels to avoid any restriction on the exertion of inlet pressure directed toward core perforation 26.

FIG. 4 shows the valve of the invention in a second and operation position wherein sleeve perforations 18 and 24 both register with core perforation 26 for fluid passage therethrough. Similarly, sleeve perforations 22 and 28 both register with core perforation 20 for fluid passage therethrough.

FIG. 5 shows the valve of the invention in a third and operational position wherein sleeve perforations 18 and 22 both register with core perforation 26 for fluid passage therethrough. Similarly, sleeve perforations 24 and 28 both register with core perforation 20 for fluid passage therethrough.

Figure 8:
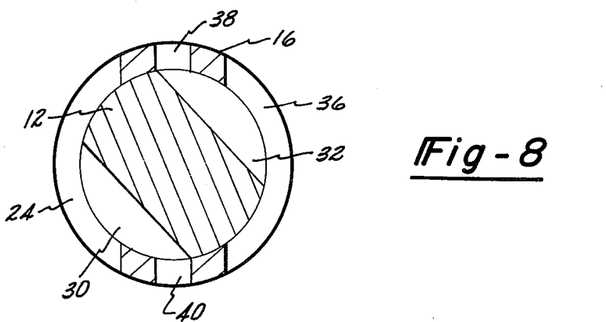
FIG. 8 is a cross-sectional view of the spool valve of FIG. 5 following rotation of the core member relative to the sleeve member to a third and operational position.

FIGS. 6–8 inclusive, show another modification of the valve of the invention wherein two transverse peripheral channels are formed in the valve in its manufacturing position (FIG. 6) resulting in core perforations 30, 32 and sleeve perforations 34, 36. Immediate perforations 38, 40 are made in the sleeve only. FIGS. 7 and 8 show respectively operational positions of the valve of FIG. 6 in the same manner as shown in FIGS. 4 and 5 for the valve of FIG. 2.

Figure 9:
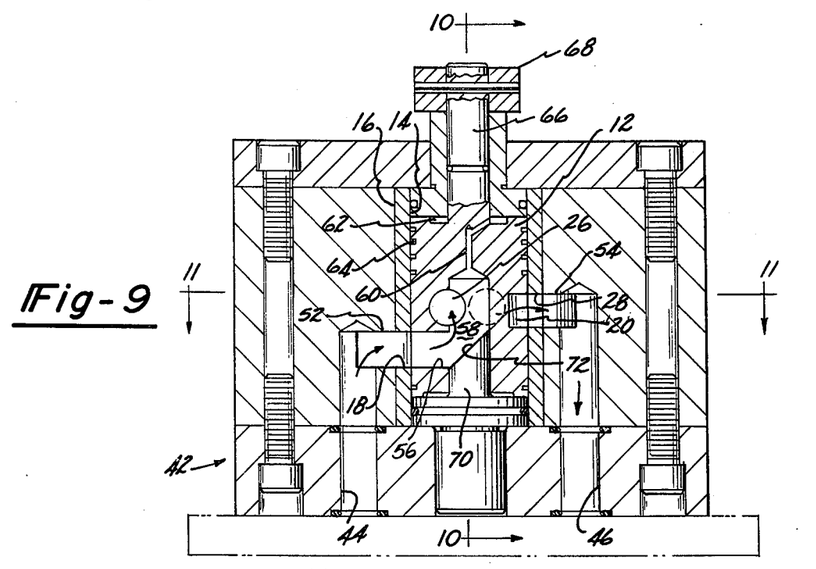
FIG. 9 is a cross-sectional view of a third and preferred embodiment of the valve of the invention as used to control fluid flow to and from a hydraulic lift (not shown), and wherein a peripheral channel and a cylindrical hole are in different planes transverse to the axis of the valve.

Referring more particularly to FIGS. 9–12, inclusive, a housing 42 is provided with fluid inlet passage 44 and fluid exhaust passage 46 (see FIG. 9). Intermediate passages 48, 50 (see FIG. 10) serve alternately as a supply port and a return port for fluid operating, for example, a hydraulic lift (not shown). Housing fluid inlet and exhaust passages 44, 46 terminate at their innermost ends in crescent shaped enlargements 52, 54 which envelope, respectively, sleeve inlet port 18 and sleeve outlet port 28.

Valve sleeve member 16 is provided with a peripheral channel perforation 18 (the inlet port), oppositely disposed cylindrical perforations 22, 24 (the intermediate ports), and cylindrical perforation 28 (the outlet port).

Core member 12 is provided with a peripheral channel perforation 20 and cylindrical perforation 26. Additionally, core member 12 is provided with a lateral bore 56 for receiving fluid from sleeve inlet port 18, a center bore 58 for receiving fluid from lateral bore 56 and directing fluid to cylindrical perforation 26, a pressure compensating orifice 60 leading from the bore 58 to an annular pressure compensating recess 62 in the top end of the core member 12, a plurality of peripheral grooves 64 constituting a labyrinth seal between core and sleeve, and a stem portion 66 provided with a handle 68. The center bore 58 is closed at its bottom end (as shown) with a plug member 70 having a slanted top surface 72 for directing inlet pressure upward to decrease side thrust within the core. Such side thrust tends to "lock" the core against the sleeve making rotation of the core rather difficult. Recess 62 will be pressurized proportionately to inlet pressure to provide a downward thrust on the core member 12 counterbalancing the upward thrust of fluid pressure diverted upwardly within the center bore 58 by the surface 72 of the plug member 70.

It will be noted in the structure of FIGS. 9–12 inclusive that the transverse peripheral channel perforations of the sleeve and core (18 and 20, respectively) are spaced longitudinally from each other when the valve is an operational position. This is different from the structure of FIGS. 1–5 inclusive where the respective channel perforations are not so spaced. Thus, the manufacturing of the spool valve of FIGS. 9–12 requires, for best results, that the core 12 and sleeve 16 are first positioned such that sleeve perforation site 18 and core perforation site 20 are in juxtaposition for channeling by a single machine operation. Following such channeling, the core is moved both longitudinally and rotationally to achieve their relative position show in in FIGS. 9–12.

Referring more particularly to FIGS. 13–18, inclusive, there are shown modifications of the spool valves of the invention which are particularly adapted for operation under high fluid pressures, as for example, 3000 PSI.

Figures 13, 14A, 14B, 14C, 14D, 15A, 15B, 15C, 15D:
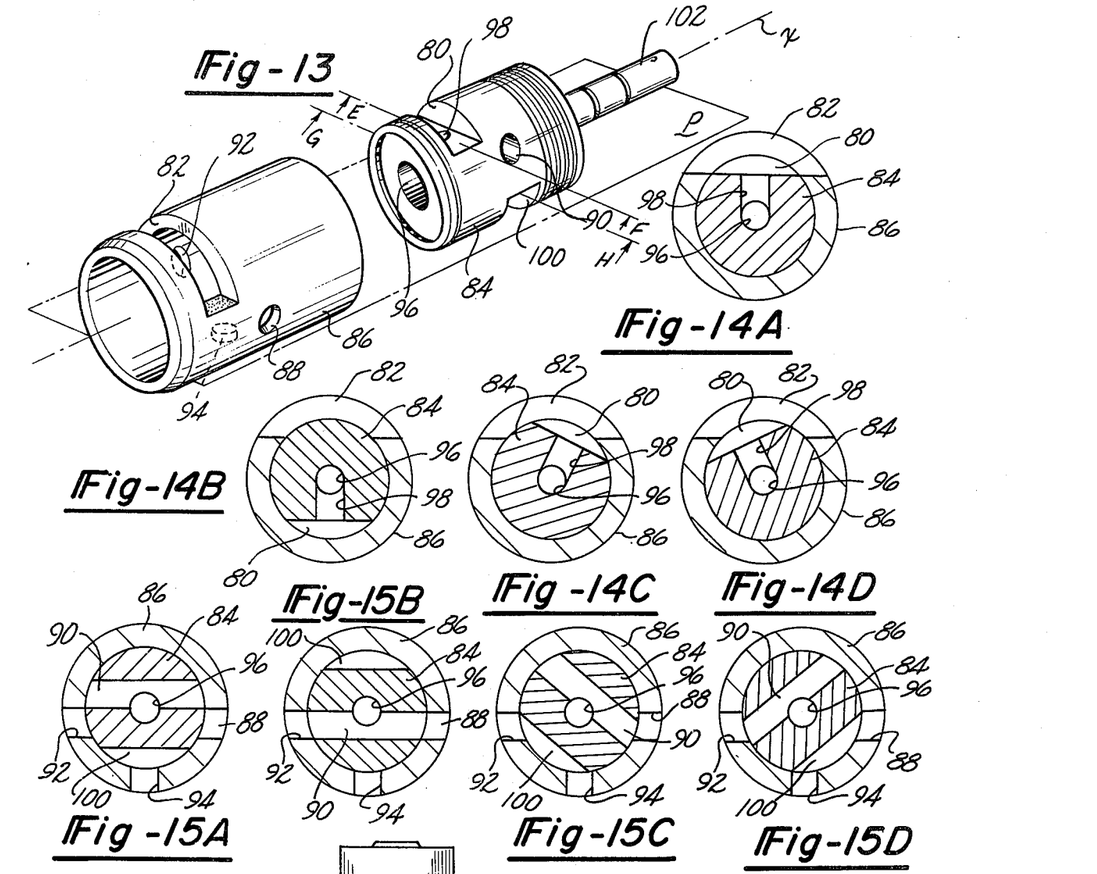

Peripheral channels 80, 82 in core 84 and sleeve 86 respectively, (FIG. 13) can be made by a single machine operation when core 84 is inserted into sleeve 86 and held in a first, fixed manufacturing position (see also FIG. 14–A). Core 84 can then be rotated 180° to and held in a fixed, second manufacturing position where holes 88, 90, 92 can be drilled in a single machine operation (see also FIG. 15–B). Hole 94 in sleeve 86 is positioned intermediate sleeve holes 88, 92.

Axially extending bore 96 joins hole 90 in core 82 with a hole 98 which joins peripheral channel 82 with axial bore 96. A second peripheral channel 100 in core 82 and in operational positions of the valve registers with sleeve hole 94 and alternately with sleeve port 92 (FIG. 15–C) and sleeve port 88 (FIG. 15–D). A stem 102 suitable for attachment of a handle (not shown) for rotating the core 82 is shown (FIGS. 13, 16, 17 and 18).

Referring more particularly to FIG. 16 in which the valve of FIG. 13 is used to control flow into and out of hydraulic lift (not shown), a housing 104 is provided with fluid inlet passage 106 and fluid exhaust passage 108. Housing fluid inlet and exhaust passages 106, 108 terminate at their innermost ends in crescent shaped enlargements 110, 112 which envelope, respectively, sleeve inlet channel, port 82, and sleeve outlet port 94.

Valve sleeve member 86 is provided with a peripheral channel perforation 82 (the inlet port), oppositely disposed cylindrical perforations 88, 92 (the intermediate ports), and cylindrical perforation 94 (the outlet port).

Core member 84 is provided with a peripheral channel perforation 80 and cylindrical perforation 90. Additionally, core member 84 is provided with a bore 98 for receiving fluid from sleeve inlet port 82 and core channel 80, a center bore 96 for receiving fluid from bore 98 and directing fluid to core cylindrical perforation 90, a peripheral channel 100, a pressure compensating orifice 114 leading from the bore 96 to an annular pressure compensating recess 115 in the top end of the core member 84, a plurality of peripheral grooves 116 constituting a labyrinth seal between core and sleeve, and a stem portion 102. The center bore 96 is closed at its bottom end (as shown) with a plug member 118 having a slanted top surface 120 for directing inlet pressure upward to decrease side thrust within the core. Recess 115 is pressurized proportionately to inlet pressure to provide a downward thrust on the core member 84 counter-balancing the upward thrust of fluid pressure diverted upwardly within the center bore 96 by the surface 120 of the plug 118.

Figure 10:
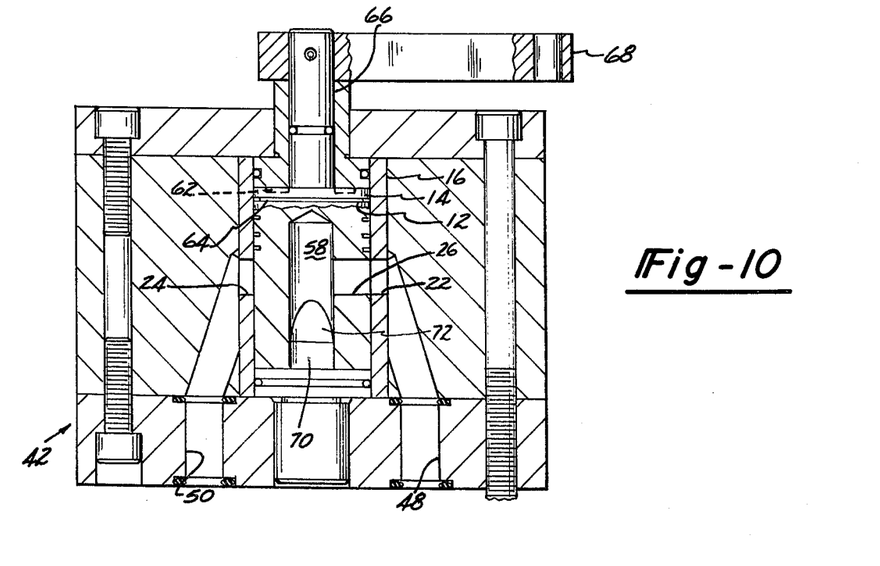
FIG. 10 is a cross-sectional view of the structure shown in FIG. 9 taken on the line 10—10 thereof.

A sectional view of FIG. 16 perpendicular to the view shown therein is substantially identical to FIG. 10 and therefore is not repeated.

Figure 17:
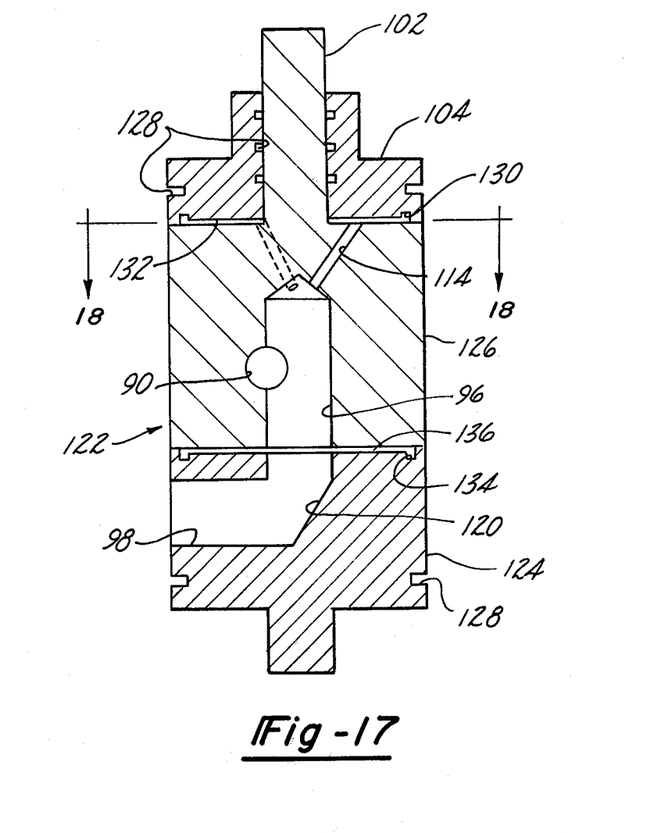
FIG. 17 is a cross-sectional view of a core of an alternative core structure suitable for use with various embodiments of the invention where an unusual high fluid pressure is involved.

FIG. 17 shows in greater detail modifications which can be made to a core, indicated generally as 122, to enable a spool valve of the type claimed herein to operate under relatively high fluid pressures while avoid the locking of the core against the sleeve because of sideways thrust caused by the fluid inlet pressure. Also shown is an alternative modification wherein the plug for the center bore and the bottom portion of the core 114 are a unitary structure. Thus core 122 is provided with bottom portion 124 and a top portion 126. A portion of housing 104 is positioned immediately above core portion 126. As in the case of the valve shown in FIG. 13 there are provided a center bore 96. a lateral bore 98, a transverse lateral bore 90, a stem 102, a fluid deflecting surface 120 (as in FIG. 16), and pressure compensating orifice 114 (as in FIG. 16). Cold oil grooves 128 are provided at suitable positions along the interface of stem 102 and housing 104 and along the periphery of the core 122.

An annular hydrostatic groove 130 and a recessed area 132 are provided in the bottom of housing portion 104. Similarly, an annular hydrostatic groove 134 and a recessed area 136 are provided in core bottom portion 124. The grooves 130, 134 and the recesses 132, 136 can be pressurized proportionately to inlet pressure to provide for the containment of fluid, such as hydraulic fluid within the core 122 and to assist in preventing locking of the valve by the tendency of the core to "float" on the wide area fluid boundaries.

DESCRIPTION OF OPERATION

Referring particularly to FIGS. 9–12 inclusive, core member 12 is positioned in sleeve member 16 in a first, or manufacturing position. The peripheral channel perforations 18, 20 are made simultaneously in the members by a single machining operation by suitable shaping tools (not shown). As indicated above, the core 12 is then moved longitudinally relative to the sleeve. The sleeve cylindrical perforations 22, 24 and the core perforation 26 are then made simultaneously in the members by a single drilling operation. Other machine operations, such as the drilling of sleeve perforation 28 and core perforations 56, 58 are carried out in any suitable manner.

Figure 11:
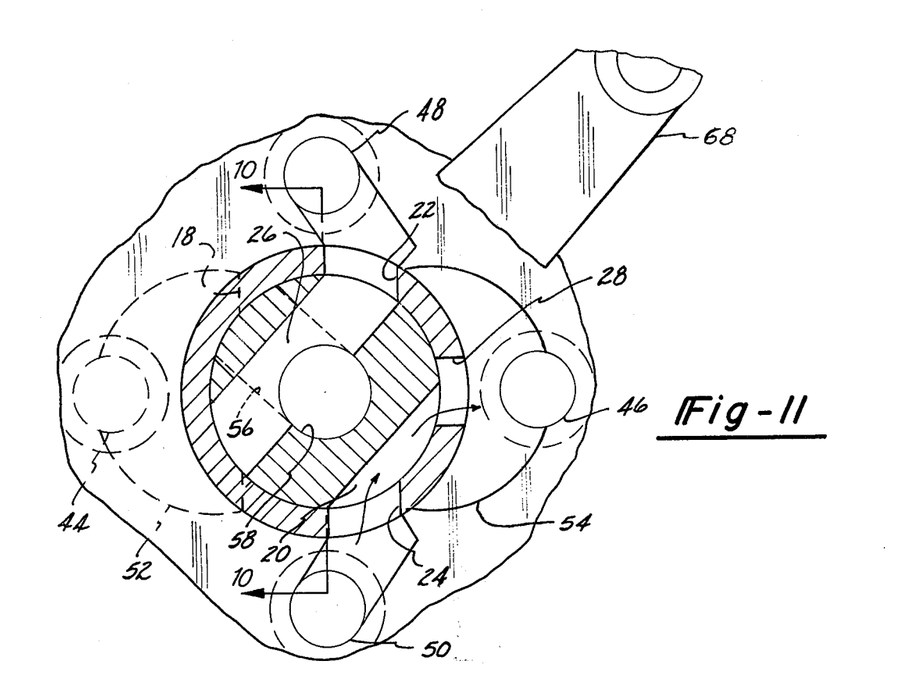
FIG. 11 is an enlarged cross-sectional view of a portion of the valve of FIG. 9 taken substantially on line 11—11 of FIG. 9 and illustrating the flow of fluid through the device thereof in an operational position of the core member of the valve relative to the sleeve member.

Following the manufacturing step, the core 12 may be rotated to the operational position shown in FIG. 11 where sleeve inlet port 18 serves as an inlet from opening 52 to port 56 for fluid to the valve and sleeve outlet port 28 serves as a discharge for fluid from core perforation 20 to opening 54. Intermediate port 22 becomes the fluid supply port for passage 48 leading to a second device, such as a hydraulic lift (not shown), and intermediate port 24 becomes a fluid return port for return of fluid to the valve from passage 50 leading from another side of the hydraulic lift.

Figure 12:
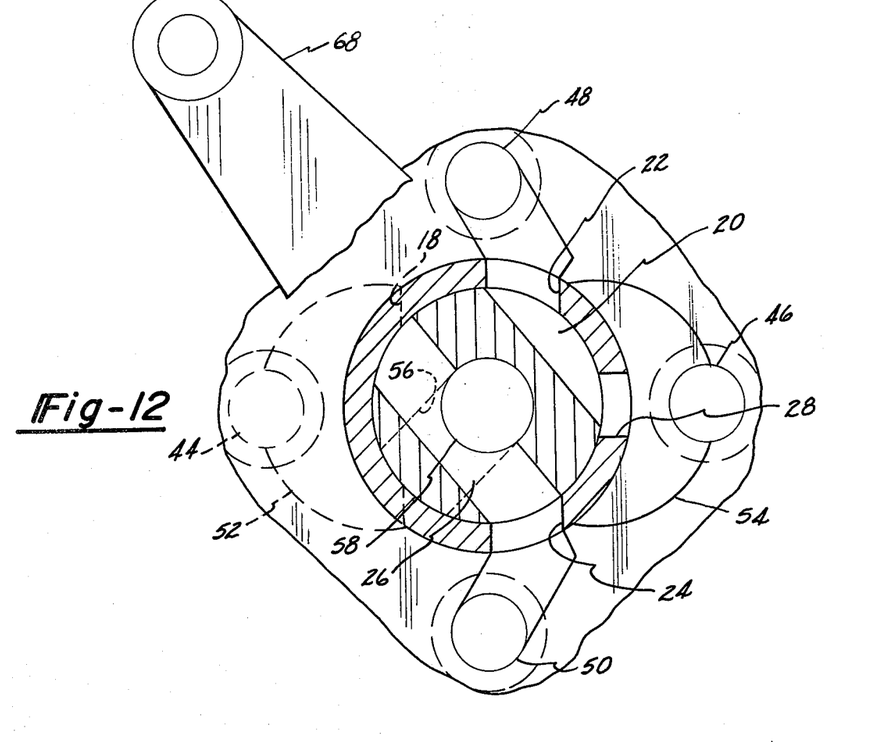
FIG. 12 is a cross-sectional view taken as in FIG. 11 but illustrating the flow of fluid through the device of FIG. 9 in another operational position of the core member of the valve relative to the sleeve member.

When the core member 12 is rotated from the position shown in FIG. 11 to the position shown in FIG. 12, it will be seen that the intermediate ports 22, 24 have exchanged functions, port 24 now being the fluid supply port and port 22 now being the return port for fluid passing to and from the hydraulic lift, for example. This is similar to the operation of the structure of FIG. 2 where FIGS. 4 and 5 show the operational positions. It is also similar to the structure of FIG. 6 where FIGS. 7 and 8 show the operational positions.

Thus, in the valve device of FIGS. 9–12, inclusive, fluid enters the inlet passage 44 of the housing 42, passes through the sleeve inlet port 18, and then passes through the lateral core perforation 56 to the center bore 58 of the core 12. As the fluid enters the center bore 58 it strikes the slanted top 72 of the plug 70 in a manner to minimize frictional resistance to fluid flow and divert fluid pressure upward as previously described.

Fluid from the center bore 58 enters the cylindrical perforation 26 of the core 12 and then passes to either intermediate port 22 (if the device is in the operational position shown in FIG. 11) or intermediate port 24 (if the device is in the operational position shown in FIG. 12). Fluid will then pass to a hydraulic lift, for example, to and from the intermediate ports 22, 24. Fluid next passes to the sleeve outlet port 28 from intermediate port 24 (if the device is in the operational position shown in FIG. 11) or from the intermediate port 22 (if the device is in the operational position shown in FIG. 12).

Fluid leaving the sleeve outlet port 28 passes into the housing exhaust passage 46 and then into a supply sump (not shown) usually for recycling.

Figure 18:
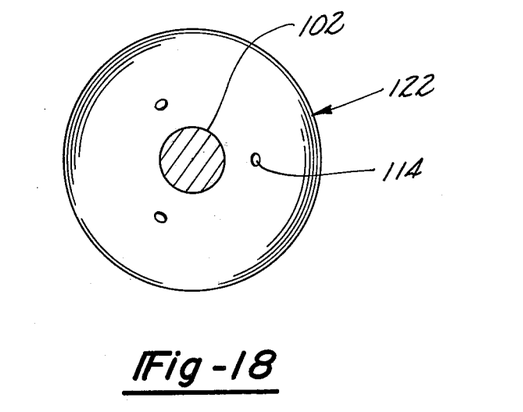
FIG. 18 is a cross sectional view of the core shown in FIG. 17 taken on the line 18—18 thereof.

The valve of FIGS. 13–16 inclusive, and valves with the modified core of FIGS. 17–18 operate in the same general manner as described in connection with the valve of FIGS. 9–12 except that, for example, (a) the inlet peripheral channel 82 of the sleeve 86 and the peripheral channel 80 of core 84, following manufacture, continue to register for fluid flow therethrough and (b) a second peripheral channel 100 is provided in the core 84 to register with sleeve exit port 94 on the one hand and alternatively with sleeve ports 88 and 92 on the other hand.

Thus, using the structure of FIG. 16 in the operational position illustrated in FIGS. 14–C and 15–C by way of example, a stream of fluid enters inlet passage 106 and then flows through sleeve channel 82, core channel 80, lateral hole 98, axial hole 96, hole 90, and exits from sleeve port 88 to, for example, a hydraulic lift (not shown).

Simultaneously, fluid from the hydraulic lift enters sleeve port 92 and then flows through core channel 100, sleeve exit port 94, and fluid exit passage 108. As indicated above, the valve, particularly by the positioning of the peripheral channels, achieves considerable versatility in registering various ports for fluid flow therethrough.

It will be apparent to one skilled in the art to which the invention pertains that various changes and modifications may be made therein without departing from the spirit of the invention or the scope of the appended claims.

I claim:
1. In a spool valve structure comprising
   a. a sleeve member, perforated to provide a plurality of perforations at least one of which is a sleeve inlet port perforation and at least one of which is a sleeve outlet port perforation for a fluid passing through said structure;
   b. a cylindrical core member, rotatably enclosed in said sleeve member and provided with a perforation adapted to register with a sleeve perforation for the passage of a fluid from one such perforation to the other; and
   c. wherein, in a first position of said core member relative to said sleeve member at least one of said sleeve perforations and said core perforations have congruent boundaries at the interface thereof and said sleeve perforation extends into said core perforation at the interface of said members on a transverse axis parallel to and offset to one side of a plane containing the longitudinal axes of said members, and that, upon 180° relative rotation of said member, the latter sleeve perforation and core perforation will be disposed on respective parallel axes offset from opposite sides of said plane;
   the improvement which comprises, in said first position, one said perforation extending through said sleeve member into said core member to form a peripheral channel and, in an operational position of said valve, said peripheral channel in said core being in register with both a sleeve inlet port perforation and a sleeve outlet port perforation.

2. The structure according to claim 1 wherein the improvement comprises additionally a second such transverse perforation extending through said sleeve member and said core member to form a peripheral channel.

3. The structure according to claim 1 wherein the improvement comprises additionally a second such transverse perforation extending through said sleeve member and said core member to form a cylindrical hole.

4. The structure according to claim 1 wherein said core is provided with a second peripheral channel.

5. A valve structure for supplying fluid to and removing fluid from a hydraulic user, said structure comprising:
   A. a housing having: (1) a fluid inlet passage, (2) a fluid outlet passage and (3) first and second intermediate passages, each serving alternately as a fluid supply passage to said user and a fluid return passage from said user;
   B. a spool valve within said housing and comprising (1) a sleeve member perforated to provide a sleeve fluid inlet perforation and a sleeve fluid outlet perforation for a fluid passing through said structure; (2) a cylindrical core member, rotatably enclosed in said sleeve member and provided with a first perforation and a second perforation, said first perforation adapted to register with a sleeve perforation for the passage of a fluid from one such perforation to the other; and (3) wherein, in a first position of said core member relative to said sleeve member, at least one of said sleeve perforations extends into said first core perforation at the interface of said members to form a peripheral channel on a transverse axis parallel to and offset to one side of a plane containing the longitudinal axes of said members, and that, upon 180° relative rotation of said members, the latter sleeve perforation and core perforation will be disposed on respective parallel axes offset from opposite sides of said plane; and
   C. said spool valve having (1) a second and operational position of said core member relative to said sleeve member wherein said first core perforation registers with said sleeve fluid outlet perforation and with said first intermediate passage for passage of fluid therethrough, and said second core perforation registers with said second intermediate passage and with said sleeve fluid inlet perforation for passage of fluid therethrough; and (2) a third and operational position of said core member relative to said sleeve member wherein said first core perforation registers with said sleeve fluid outlet perforation and with said second intermediate passage for passage of fluid therethrough, and said second core perforation registers with said first intermediate passage and with said sleeve fluid inlet port for fluid passage therethrough.

6. The structure according to claim 5 wherein, in one position of said valve, a sleeve perforation and a core perforation form peripheral channels with congruent boundaries at an interface between said core and sleeve and wherein said core is provided with a second perforation in the form of a peripheral boundary.

7. The structure according to claim 5 wherein, in said first position of said core member relative to said sleeve member, both said sleeve perforations extend respectively into said core perforations to form peripheral channels.

8. The structure according to claim 5 wherein, in said first position of said core member relative to said sleeve member, one of said sleeve perforations extends into said second core perforation to form a cylindrical hole.

9. The structure according to claim 5 wherein said core member is provided with a longitudinal bore which intercepts one of said core perforations for fluid passage therethrough.

10. The structure according to claim 9 wherein said longitudinal bore is closed at one end by a plug extending into the intersection of said bore with one of said core perforations, said plug provided with a slanted face positioned in a manner to cause fluid moving through said intersection to strike said face at an angle.

11. A valve structure for supplying fluid to and removing fluid from a hydraulic user, said structure comprising:
A. a housing having: (1) a fluid inlet passage, (2) a fluid outlet passage and (3) first and second intermediate passages, each serving alternately as a fluid supply passage to said user and a fluid return passage from said user;
B. a spool valve within said housing and comprising (1) a sleeve member perforated to provide a sleeve fluid inlet perforation, a sleeve fluid outlet perforation and a first and second oppositely disposed sleeve intermediate port for a fluid passing through said structure; (2) a cylindrical core member, rotatably enclosed in said sleeve member and provided with a first core perforation adapted to register with said sleeve outlet perforation for the passage of a fluid therethrough, a second core perforation adapted to register with said sleeve inlet perforation for the passage of fluid therethrough, a third perforation adapted to register alternately with said sleeve intermediate ports, and a fourth perforation being an axial bore registering with said second and third core perforations; and (3) wherein, in a first and manufacturing position of said core member relative to said sleeve member, said sleeve inlet perforation extends into said first core perforation at the interface of said members to form a peripheral channel on a transverse axis parallel to and offset to one side of a plane containing the longitudinal axes of said members, and wherein, in a fourth and manufacturing position, said sleeve intermediate ports extend into said third core perforation to form a cylindrical hole on a transverse axis parallel to and offset to one side of said plane; and
C. said spool valve having (1) a second and operational position of said core member relative to said sleeve member wherein said first core perforation registers with said sleeve fluid outlet perforation and with said first sleeve intermediate port for passage of fluid therethrough, and said third core perforation registers with said second sleeve intermediate port and with said fourth core perforation for passage of fluid therethrough; and (2) a third and operational position of said core member relative to said sleeve member wherein said first core perforation registers with said sleeve fluid inlet perforation and with said second sleeve intermediate port for passage of fluid therethrough, and said third core perforation registers with said fourth core perforation and with said first sleeve intermediate port for fluid passage therethrough.

12. The structure according to claim 11 wherein said first core perforation, said second core perforation, and said sleeve fluid inlet perforation are each peripheral channels.

13. The structure according to claim 11 wherein said fourth core perforation is closed at one end by a plug extending into the intersection of said fourth core perforation with said second core perforation, said plug provided with a slanted face positioned in a manner to cause fluid moving through said intersection to strike said face at an angle.

14. In a spool valve structure comprising (a) a sleeve member, perforated to provide a sleeve inlet port perforation and a sleeve outlet port perforation for a fluid passing through said structure; (b) a cylindrical core member, rotatably enclosed in said sleeve member and provided with a perforation adapted to register with a sleeve perforation for the passage of a fluid from one such perforation to the other; and (c) wherein, in one position of said core member relative to said sleeve member, at least one of said sleeve perforations extends into said core perforation at the interface of said members on a transverse axis parallel to and offset to one side of a plane containing the longitudinal axes of said members, and that, upon 180° relative rotation of said member, the latter sleeve perforation and core perforation will be disposed on respective parallel axes offset from opposite sides of said plane: the improvement which comprises an orifice within said core through which to effect a fluid pressure counter to fluid pressure within said core.

15. The structure according to claim 14 wherein there are a plurality of said orifices.

16. The structure according to claim 14 wherein said core is provided with a separable portion which includes a fluid inlet perforation and a slanted face within said latter perforation positioned in a manner to cause fluid to strike said face at an angle.

17. The structure according to claim 14 wherein said separable portion is separated from the rest of said core by an annular recess positioned near the periphery of said core and a recessed area covering substantially the entire area within said annular recess.

* * * * *

UNITED STATES PATENT OFFICE
CERTIFICATE OF CORRECTION

PATENT NO. : 3,918,493
DATED : November 11, 1975
INVENTOR(S) : JOHN D. TOBIAS

It is certified that error appears in the above—identified patent and that said Letters Patent are hereby corrected as shown below:

Col. 3, line 29, delete "chananel" and insert --channel-- line 58, delete "is";

Col. 4, line 20, delete "immediate" and insert --intermediate--

Col. 5, line 36, before "hydraulic" insert --a--

Col. 10, line 17, delete "inlet" and insert -- outlet --.

line 61, delete "14" and insert --16--.

Signed and Sealed this sixteenth Day of March 1976

[SEAL]

Attest:

RUTH C. MASON
Attesting Officer

C. MARSHALL DANN
Commissioner of Patents and Trademarks